United States Patent [19]

Brown et al.

[11] Patent Number: 5,474,602
[45] Date of Patent: Dec. 12, 1995

[54] TREATMENT OF MAGNESIUM HYDROXIDE AND ITS USE AS PLASTICS FILLER

[75] Inventors: Stephen C. Brown, Uxbridge; Frederick H. Taylor, Buckingham; Natalie G. Mead, Hayes, all of United Kingdom

[73] Assignee: Alcan International Limited, Montreal, Canada

[21] Appl. No.: 346,831

[22] Filed: Nov. 30, 1994

Related U.S. Application Data

[63] Continuation of Ser. No. 30,215, filed as PCT/GB91/01655, Sep. 25, 1991, abandoned.

[30] Foreign Application Priority Data

Sep. 26, 1990 [GB] United Kingdom ............ 9020938

[51] Int. Cl.⁶ .................... C09D 5/18; C01F 5/14
[52] U.S. Cl. ................ 106/18.26; 423/635; 423/636
[58] Field of Search .................. 423/636, 635; 106/18.26

[56] References Cited

U.S. PATENT DOCUMENTS

| | | |
|---|---|---|
| 2,168,228 | 8/1939 | MacArthur . |
| 4,098,762 | 7/1978 | Miyata et al. . |
| 4,246,254 | 1/1981 | Miyata et al. ............ 423/635 |
| 4,423,026 | 12/1983 | Snellgrove ............... 423/636 |
| 4,698,379 | 10/1987 | Nakaya et al. ............ 423/636 |

FOREIGN PATENT DOCUMENTS

| | | |
|---|---|---|
| 2276353 | 1/1976 | France . |
| 370157 | 3/1923 | Germany . |
| 57-100918 | 6/1982 | Japan . |
| 136630A | 2/1989 | Japan . |
| 1514081 | 6/1978 | United Kingdom . |

*Primary Examiner*—Wayne Langel
*Attorney, Agent, or Firm*—Watts Hoffmann Fisher & Heinke

[57] ABSTRACT

Improved fire retardant fillers for plastics materials are described which consist of magnesium hydroxide particles of reduced average surface area. The particles are produced by contacting particles of magnesium hydroxide of a relatively high average surface area with an etching solution for a time sufficient to dissolve at least some of the particles and to leave particles of reduced average surface area.

9 Claims, No Drawings

TREATMENT OF MAGNESIUM HYDROXIDE AND ITS USE AS PLASTICS FILLER

This application is a continuation of application Ser. No. 08/030,215, filed as PCT/GB91/01655, Sep. 25, 1991, abandoned.

The present invention relates to fire retardant fillers for plastics materials based upon magnesium hydroxide.

In this specification, the phrase "fire retardant" is intended to include the terms "flame retardant" and "smoke suppressant".

It is well known that magnesium hydroxide is for many applications a superior fire retardant additive for plastics materials to the commonly-used aluminum hydroxide, usually referred to as aluminum trihydrate "ATH", in view of its greater thermal stability and its higher enthalpy of decomposition. Higher stability allows the use of higher plastics processing temperatures and thus enables a filler based on magnesium hydroxide to be used in a wider range of polymers, especially polypropylene and thermoplastic polyamides such as nylon which are difficult, if not impossible, to fill with aluminum hydroxide. Even with other polymers the use of processing temperatures which are higher than can be tolerated by aluminum hydroxide can enable increased plastics throughputs to be achievable and hence improve the economics for the plastics formulating process.

In practice, however, the use of magnesium hydroxide gives rise to two major difficulties. Firstly, during processing of the liquid plastics precursors or thermoplastic melts the addition of magnesium hydroxide greatly increases the viscosity of liquid and thus imposes a lower maximum filler loading for the finished plastics material than is usually desired. The second disadvantage relates to the physical properties of the finished plastics materials when filled with magnesium hydroxide. Generally they have reduced impact strength and elongation, and are more difficult to shape.

Both of these disadvantages apply particularly to the cheapest form of magnesium hydroxide currently available, namely that derived from sea water, and are considered to arise because of the unfavourable surface characteristics of the magnesium hydroxide particles.

The latter disadvantage is referred to in GB-A-1514081, where the Patentees' claimed invention lies in the use of a magnesium hydroxide preparation method involving heating a basic magnesium chloride or magnesium nitrate. Although the relatively large crystals produced by that process apparently possess better physical properties than the standard polycrystalline material which is conventionally produced from sea water, the magnesium hydroxide produced by this process is relatively expensive.

The present invention seeks therefore to provide a relatively inexpensive route to magnesium hydroxide which possesses substantially equivalent flame retardant properties as compared to the magnesium hydroxide currently available, whilst at the same time not increasing unduly the viscosity of the liquid plastics precursors or thermoplastics melts into which the magnesium hydroxide particles are incorporated.

In accordance with the present invention there is provided a method of producing magnesium hydroxide particles of reduced average surface area which method comprises contacting particles of magnesium hydroxide of a relatively high average surface area with an etching solution for a time sufficient to dissolve at least some of the particles and to leave particles of reduced average surface area.

The present invention also provides magnesium hydroxide particles of reduced average surface area when produced by a method as described in the aforesaid paragraph, and also plastics materials comprising as a flame retardant filler magnesium hydroxide particles when produced by this process.

Whilst not wishing to be bound by theory, it is believed that the two problems associated with the use of magnesium hydroxide as a filler in plastics materials arise from the relatively high average surface areas of the particulate material conventionally produced, especially from sea water. The primary reason for improved results being achievable by the invention described in GB-A-1514081 appears to be that relatively large particles are formed by the claimed process which have a lower average surface area than conventionally produced particles.

By etching or partially dissolving conventionally-produced magnesium hydroxide particles it has been found that the average surface area of the particles can be reduced significantly without substantially adversely affecting the particles' performance as a fire retardant filler in plastics materials.

Whilst not wishing to be bound by theory, it is believed that the reduction in average surface area of the particles which is achieved in the present invention arises either because the surface roughness of the particles is reduced, or because the finest particles, which contribute most to the average surface area of a sample, are dissolved preferentially. Sometimes both mechanisms could operate.

The etching solution can be a solution of an organic or inorganic acid, such as acetic acid or dilute aqueous sulphuric acid, or a dilute aqueous solution of an ammonium salt such as ammonium chloride. Depending upon the particular etching solution used, the solution may be used at room temperature or at an elevated temperature, including its boiling point. The length of time during which the magnesium hydroxide particles are left in contact with the etching solution will depend upon the type and strength of solution used, the temperature and amount of solution used, and upon the degree of reduction in average surface area that is required, although excessively long contact times should be avoided since otherwise substantial dissolution of the particles can occur thereby reducing the yield of product and increasing its cost. Also, with excess etching solution, excessively long contact times can give rise to an increase in average surface area due to dissolution of a significant proportion of the larger particles. There is generally no need to use elevated pressures, and it is preferred that the etching process be carried out at atmospheric pressure. Desirably the average surface area of the treated particles should be less than 20 $m^2/g$ and preferably less than 10 $m^2/g$.

Although the magnesium hydroxide is preferably derived from sea water, it can also be obtained from any other source, for example brine.

Usually the presence of traces of etching solution on the magnesium hydroxide particles is detrimental to their operation in plastics materials as fire retardants, and therefore desirably the contacted particles are washed with water and dried prior to incorporation into the plastics materials. Treatment with an ion exchange resin to remove traces of etching solution can be used instead of, or additionally to, washing.

The plastics materials into which the magnesium hydroxide particles of the present invention can be incorporated, as well as the other additives for plastics materials that can be used, are described in GB-A-1514081.

The present invention will now be described by way of illustration in the following Examples.

EXAMPLES 1 to 11

In the following Examples eleven samples of magnesium hydroxide powder were treated under varying conditions in accordance with the present invention and the change in average surface area measured. The magnesium hydroxide powder used was that derived from sea water and sold commercially by Steetley Minerals Unlimited. Prior to treatment, it was found that the average surface area of the powder was approximately 30 m²/g.

30 g samples of the commercial powder were stirred into individual etching solutions consisting of 150 ml of dilute sulphuric acid at 1M or 2M as indicated for a specified time, and then the residual particles were washed with water and dried. Their average surface area was measured using a STROHLEIN area meter and particle size using a Coulter counter.

In Examples 1 to 5 the dilute sulphuric acid was at room temperature and had a concentration of 1M. In Example 6, the dilute sulphuric acid had a concentration of 1M but was maintained at its boiling point throughout the time that it was in contact with the magnesium hydroxide particles.

For Examples 7 to 11, the concentration of the dilute sulphuric acid was 2M and it was left at room temperature during its contact with the magnesium hydroxide particles.

The contact times and the average surface areas of the eleven samples after treatment are set out in Table 1.

TABLE 1

| Example | Time (Minutes) | Average Surface Area of Product (m²/g) |
|---|---|---|
| 1 | 15 | 25.2 |
| 2 | 30 | 21.6 |
| 3 | 45 | 22.3 |
| 4 | 60 | 23.0 |
| 5 | 120 | 21.5 |
| 6 | 30 | 4.9 |
| 7 | 15 | 19.9 |
| 8 | 30 | 18.9 |
| 9 | 45 | 23.9 |
| 10 | 60 | 13.1 |
| 11 | 120 | 12.4 |

The median particle size of the magnesium hydroxide prior to treatment was about 7 microns, and it was found that after treatment the particle size distribution of the various samples was not substantially different from that of the material prior to treatment.

All of the eleven samples performed well in fire retardancy tests, and the viscosity of the liquid plastics precursors and thermoplastics melts into which the particles were incorporated was not unduly increased. The product of Example 6 performed particularly well in view of its low average surface area.

EXAMPLE 12

A sample of $Mg(OH)_2$ with reduced average surface area was produced using the following method:

2.5 kg of $Mg(OH)_2$ was added to 12.5l of 1.5 molar sulphuric acid. The mixture was stirred for 1.5 hours and then allowed to settle. Once settlement had occurred excess liquid was poured off, replaced with de-ionised water and the mixture stirred. The solution was again allowed to settle and the excess liquid again poured off and replaced with de-ionised water. This washing sequence was repeated four times. The resulting slurry was then dried at 105° C. overnight. This procedure reduced the surface area as measured by the Strohlein method using nitrogen adsorption from 20 m²g⁻¹ to 16 m²g⁻¹.

EXAMPLE 13

Magnesium hydroxide was prepared according to the procedure of Example 12 and compounded into a polypropylene sold by ICI under the designation "GMW213" using an APV twin screw extruder (type number MP2030, length/diameter ratio 25:1). For comparison a second compounding run was then carried out using the same magnesium hydroxide starting material as in Example 12 but without the described treatment. Both treated and untreated compounding runs had the same throughput rate, feeder speed, screw speed, die pressure and die temperature, but the sample containing the treated $Mg(OH)_2$ required a compounder drive torque of only 47% of the maximum permissible whilst the sample containing the untreated feed material required 53% of maximum torque. This demonstrates the improved processing characteristic of the treated product.

EXAMPLE 14

Compounded material from Example 13 was tested for melt flow index (MFI) at 230° C. in accordance with British Standard Test BS 2782, part 7 Method 720A: 1979. The untreated magnesium hydroxide-compounded sample gave an MFI of 0.22 grams/10 minutes whereas the treated $Mg(OH)_2$ gave a value of 0.89 grams/10 minutes.

EXAMPLE 15

A different grade of polypropylene, GY545, was compounded on a single screw Brabender extruder with two types of magnesium hydroxide, one having been treated in accordance with the present invention, and the other being left untreated. Melt Flow Index of the sample was again measured. The treated sample gave an MFI value of 7.58 g/10 minutes and the untreated only 4.05 g/10 minutes.

EXAMPLE 16

Treated magnesium hydroxide prepared according to Example 12 was tested for viscosity in de-ionised water and compared with the untreated feed magnesium hydroxide. Both slurries contained 33% by weight of magnesium hydroxide and were measured at 20° C. using a Brookfield RVT viscometer with spindle "2" at 100 rpm. The treated magnesium hydroxide had a viscosity of 36 centipoise whereas the untreated feed product had a viscosity of 44 centipoise.

EXAMPLE 17

The fire retardant properties of two magnesium hydroxide samples were compared, one having been treated in accordance with the present invention and the other having been left untreated. The results are set out in Table 2.

TABLE 2

| Critical Oxygen Index of Filled Polymers | | |
|---|---|---|
| Polymer | Untreated $Mg(OH)_2$ | Treated $Mg(OH)_2$ |
| Ethylene-vinyl acetate[1] | 29.0 | 28.7 |
| Polypropylene[2] | 26.0 | 24.9 |

TABLE 2-continued

| Critical Oxygen Index of Filled Polymers | | |
|---|---|---|
| Polymer | Untreated Mg(OH)$_2$ | Treated Mg(OH)$_2$ |
| Polyester Resin | 25.5 | 25.8 |

Notes:
[1]Produced by Bayer under the trade mark LEVAPREN 400.
[2]Produced by ICI under the designation "GMW 213".

It can be seen that the treating of the magnesium hydroxide in accordance with the present invention did not adversely affect its fire retardant properties.

We claim:

1. A method of producing magnesium hydroxide particles of reduced average surface area for use as a fire retardant filler material, which method comprises contacting particles of magnesium hydroxide of a relatively high average surface area with an etching solution for a time sufficient to dissolve at least some of the particles and to leave particles of reduced average surface area, and thereafter introducing said particles of reduced average surface area into a plastics material.

2. A method as claimed in claim 1 wherein the etching solution is an aqueous solution of an inorganic acid.

3. A method as claimed in claim 2 wherein the etching solution is dilute sulphuric acid.

4. A method as claimed in claim 1 wherein the etching solution is a dilute aqueous solution of an ammonium salt.

5. A method as claimed in claim 4 wherein the ammonium salt is ammonium chloride.

6. A method as claimed in claim 1 wherein the particles are contacted with boiling etching solution.

7. A method as claimed in any one of claims 1–6 including the steps of washing the contacted particles with water and drying them.

8. A method as claimed in any one of claims 1–6 wherein the relatively high average surface area magnesium hydroxide particles are derived from sea water.

9. A method of producing magnesium hydroxide particles of reduced average surface area which method comprises contacting particles of magnesium hydroxide of a relatively high average surface area with an etching solution for a time sufficient to dissolve at least some of the particles and to leave particles of reduced average surface area, and thereafter treating said particles of reduced average surface area to remove said etching solution without destroying said particles of reduced average surface area.

* * * * *